(12) United States Patent
Clarke et al.

(10) Patent No.: US 7,293,794 B2
(45) Date of Patent: Nov. 13, 2007

(54) COVER ATTACHMENT

(75) Inventors: Curtis Clarke, Grand Blanc, MI (US); Steven G. Moon, Swartz Creek, MI (US); Paul A. Hoover, Lake Orion, MI (US); David L. Guyton, Holly, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days.

(21) Appl. No.: 11/094,271

(22) Filed: Mar. 31, 2005

(65) Prior Publication Data

US 2006/0220352 A1    Oct. 5, 2006

(51) Int. Cl.
*B60R 21/16* (2006.01)

(52) U.S. Cl. ............................................. 280/731
(58) Field of Classification Search ........... 280/731, 280/728.2
See application file for complete search history.

(56) References Cited

U.S. PATENT DOCUMENTS

| | | | |
|---|---|---|---|
| 2,568,370 A * | 9/1951 | Scuderi .................. 301/9.1 |
| 5,275,432 A | 1/1994 | Pray et al. |
| 5,354,093 A | 10/1994 | Schenck et al. |
| 5,388,858 A | 2/1995 | Cuevas |
| 5,409,256 A | 4/1995 | Gordon et al. |
| 5,445,406 A | 8/1995 | Jones |
| 5,445,409 A | 8/1995 | Abramczyk et al. |
| 5,474,323 A | 12/1995 | Davidson |
| 5,496,057 A | 3/1996 | Niederman |
| 5,501,484 A | 3/1996 | Saderholm et al. |
| 5,508,481 A | 4/1996 | Williams et al. |
| 5,511,819 A | 4/1996 | Spilker et al. |
| 5,538,277 A | 7/1996 | Frary et al. |
| 5,620,201 A | 4/1997 | Ricks |
| 5,658,008 A | 8/1997 | Herrmann et al. |
| 5,678,850 A | 10/1997 | Ricks et al. |
| 5,681,052 A * | 10/1997 | Ricks et al. .......... 280/743.1 |
| 5,709,402 A | 1/1998 | Leonard |
| 5,762,361 A | 6/1998 | Herrmann et al. |
| 5,765,860 A | 6/1998 | Osborn et al. |
| 5,775,725 A | 7/1998 | Hodac et al. |
| 5,779,261 A | 7/1998 | Honda |
| 5,797,622 A | 8/1998 | Turner et al. |
| 5,806,879 A | 9/1998 | Hamada et al. |
| 5,853,190 A | 12/1998 | Rion et al. |
| 6,036,222 A | 3/2000 | Holmes et al. |
| 6,053,528 A | 4/2000 | Marx et al. |
| 6,120,056 A | 9/2000 | Ryan et al. |
| 6,126,191 A | 10/2000 | Pepperine et al. |
| 6,126,192 A | 10/2000 | Enders |
| 6,149,184 A | 11/2000 | Ennis et al. |
| 6,189,920 B1 | 2/2001 | Bayley |
| 6,299,196 B1 | 10/2001 | Suzuki et al. |
| 6,325,407 B1 | 12/2001 | Soderquist |
| 6,347,806 B1 | 2/2002 | Froude et al. |

(Continued)

*Primary Examiner*—Faye M. Fleming
(74) *Attorney, Agent, or Firm*—Foley and Lardner LLP

(57) ABSTRACT

An airbag assembly includes a module with a base plate, an airbag, and a housing for the airbag; and a cover removably attached to the module. The cover can be attached to the housing or base plate without fasteners. An outward extending locking piece is configured to attach to an opening to lock the cover, housing and base plate together. The base plate can also include locking tabs configured to fit in corresponding notches in the cover.

16 Claims, 4 Drawing Sheets

U.S. PATENT DOCUMENTS

| | | |
|---|---|---|
| 6,367,835 B1 | 4/2002 | Maguire |
| 6,371,508 B1 | 4/2002 | Baur et al. |
| 6,419,261 B1 | 7/2002 | Ibe |
| 6,474,682 B2 | 11/2002 | Ikeda et al. |
| 6,554,312 B2 | 4/2003 | Sakane |
| 6,702,319 B2 | 3/2004 | Sczeburek et al. |
| 6,783,150 B2 | 8/2004 | Ahlquist |
| 6,802,193 B1 * | 10/2004 | Long .......................... 70/207 |
| 2002/0067028 A1 | 6/2002 | Ostermann et al. |
| 2002/0096866 A1 | 7/2002 | Ireton |
| 2002/0113419 A1 | 8/2002 | Kai et al. |
| 2002/0153708 A1 | 10/2002 | Kreuzer |
| 2004/0041370 A1 | 3/2004 | Hier et al. |
| 2004/0061315 A1 | 4/2004 | Schneider |
| 2004/0195808 A1 | 10/2004 | Amamori |
| 2006/0208465 A1 * | 9/2006 | Worrell ................... 280/728.2 |

* cited by examiner

COVER ATTACHMENT

BACKGROUND

The present invention relates generally to the field of airbag covers and attachments.

Air bag devices, such as driver seat air bag devices and passenger seat air bag devices, are widely used to protect passengers from the impact produced during a vehicle collision. A driver seat air bag device is typically mounted on a boss of a steering wheel and includes a gas injecting inflator, an air bag, and a cover accommodating the air bag in a folded state. During collision of the vehicle, the gas injected from the inflator inflates the air bag. This ruptures the cover, which is made of a soft resin, and forms an opening in the cover. Accordingly, the air bag is inflated through the opening toward the vehicle's driver.

A conventional module for housing an air bag device in a vehicle instrument panel has a cover or deployment door which attaches to a housing or canister in which an air bag and inflator are housed. Most commonly, a plurality of threaded studs extend from the canister about its mouth and the cover has corresponding complementary holes which mate with the studs. A reinforcement plate is then mated with studs and threadingly retained by nuts to trap the cover between the plate and canister. By trapping the cover to the canister along at least a pair of primary opposed edges, the cover is securely retained to the canister even during deployment of an air bag through rip seams formed in the cover. Preferably, a rip seam pattern defines a pair of opposed deployment doors in the cover with edge hinges for integrally retaining each door in hinged relation with the canister during air bag deployment. However, such systems require a large number of separate pieces when assembling the cover to the canister which increases assembly time and component expense. Use of a plurality of separate fasteners and support bracketry also complicates the assembly and repair. Furthermore, retention of a cover to a canister with threaded studs often requires checking for inadvertent cross-threading of the studs during assembly in order to verify proper assembly. Furthermore, the presentation of an air bag can be modified when the cover separates from the canister during deployment which varies the restraint performance from a designed and expected performance.

An alternative method for retaining a cover to a canister includes mounting the canister to a vehicle instrument panel support structure and separately fastening the cover to adjacent surrounding instrument panel structure such that the cover and canister are engaged in abutment but are not actually physically retained together.

In another version, one edge of an air bag module cover is retained to a canister by trapping it against the canister with threaded fasteners and a reinforcement plate. The opposite edge is then snap-fit engaged with the corresponding opposite edge of the canister in order to facilitate assembly and to reduce the number of parts in the system. However, such a system can not be totally snap-assembled to a canister in a quick and efficient manner so that separate fasteners and plate reinforcement assemblies are not needed when retaining the cover to the canister.

An even further version utilizes a cover which snap-fit engages to a housing with tabs to eliminate these fasteners. However, the entire face of the cover separates from the tabs along one entire edge, and a hinge is formed adjacent the tabs on the opposite edge such that the entire cover face forms a pivoting door for deployment of an air bag. Such a design does not fully circumferentially retain the cover to the canister during air bag deployment.

Further methods are available for retaining a cover to a canister when constructing a passenger air bag module, for example, a plurality of rivets can be used to trap a cover to a canister about its mouth. When rivets are used, there is often concern over the quality of the assembled rivets, as well as the integrity of the riveted assembly, namely its reliability and strength when subjected to forces and loads generated during an air bag's deployment through the cover.

Additional complications exist when utilizing fasteners and reinforcing plates to secure an air bag cover to a canister. For example, threaded fasteners are susceptible of loosening from vibration as a vehicle travels over a bumpy road and therefore require use of a thread binding agent or a lock washer to prevent loosening. This further increases the number of parts, complicates the assembly, and adds to cost and time required for assembly. As a result, such systems for attaching a cover to a canister tend to be less feasible when constructing air bag modules for use in high volume and low cost applications.

SUMMARY

According to another embodiment, an airbag module is provided that comprises a base plate, an airbag, a housing for the airbag and a cover removably attached to the module. The base plate includes a locking tab configured to fit into a corresponding notch in the cover.

According to one embodiment of the invention, an airbag module is provided. The airbag module comprises a base plate, an airbag, a housing for the airbag and a cover removably attached to the module. The cover includes an extending locking piece configured to attach to the housing or base plate.

According to another embodiment, airbag module is provided. The airbag module comprises a base plate, an airbag, a housing for the airbag and a cover removably attached to the module. The base plate includes an outward extending locking piece configured to attach to the cover.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Hereinafter, embodiments of the present invention will be described with reference to the attached drawings.

Figure 1:
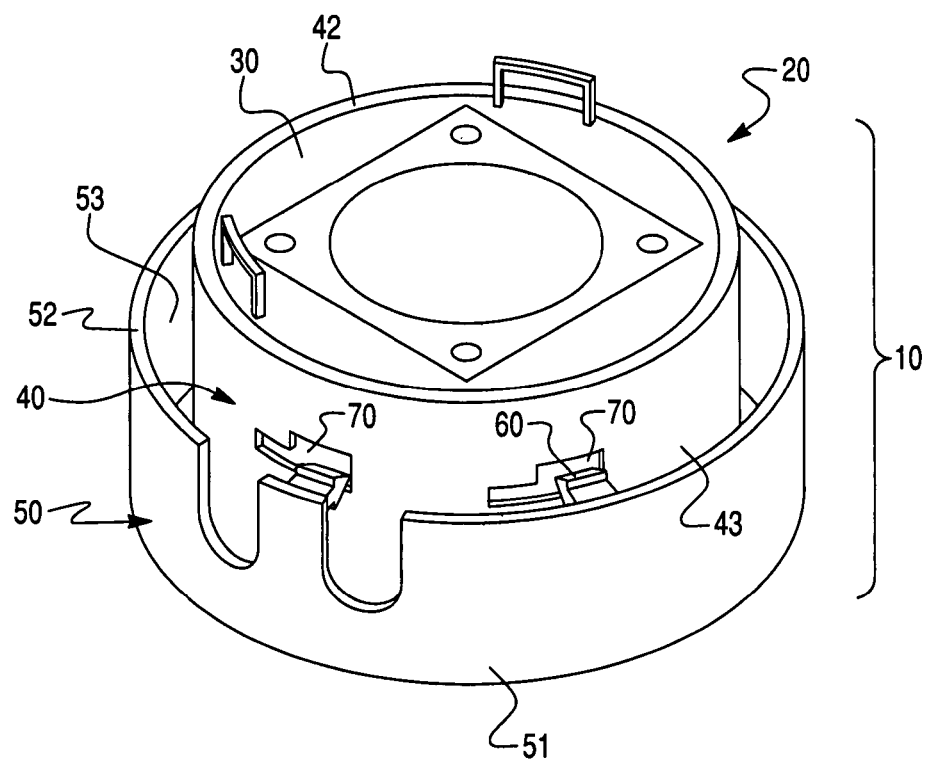
FIG. 1 is a perspective view of an airbag module.
Figure 2:
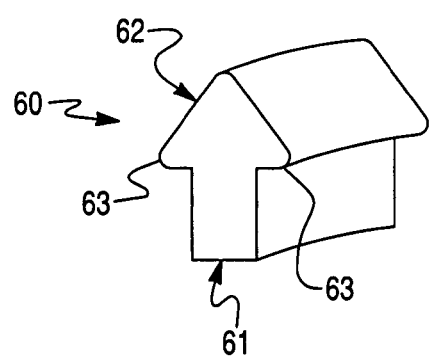
FIG. 2 is a perspective view of a locking piece of the airbag module of FIG. 1.
Figure 3:
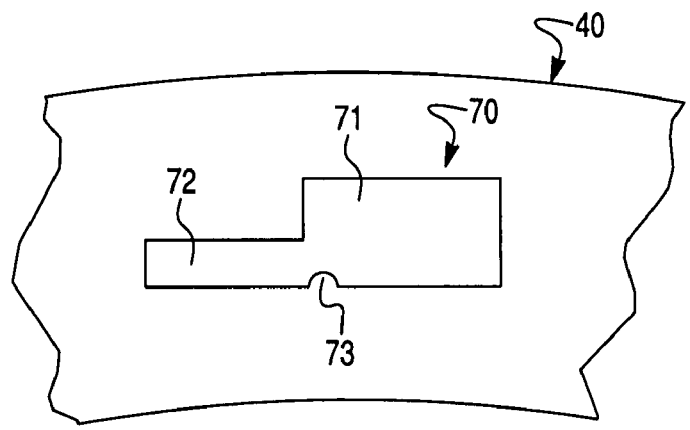
FIG. 3 is a top view of an opening of the airbag module of FIG. 1.

FIGS. 1-3 show an embodiment of an airbag assembly 10. The airbag assembly 10 includes an airbag module 20 with an airbag cushion (not shown). The module 20 includes an inflator (not shown), a base plate 30, a housing 40 for the airbag and a cover 50.

The airbag module 20 may be mounted in the steering wheel of a vehicle, the front dashboard panel or other suitable location in the vehicle. The airbag module 20 is positioned within the dashboard panel of the vehicle in order to protect an occupant in a collision, specifically a frontal collision. However, the airbag module 20 may be mounted along the side, in a door, in a steering wheel, or any other suitable location for protecting a passenger or driver of a vehicle. The airbag module 20, when mounted in the steering wheel, may be positioned adjacent a horn assembly, such as a floating horn assembly.

In a floating horn assembly, a horn switch is turned on only by actuation of the module cover 50 when the cover 50 is pressed. The horn-switch (not shown) can be a separate part from the base plate 30. Thus, the base plate 30 can be common to various models of an airbag assembly 10. When the airbag assembly 10 is formed such that not the entire airbag assembly, but only the module cover 50 is to be actuated, the pushing force for turning on the horn switch can be small.

The inflator (not shown) provides the inflation gas to inflate and deploy the airbag cushion during a collision. The inflator may comprise a gas generant or propellant in order to provide inflation gas to the airbag cushion. In addition, the inflator may include a decomposing type material as the source of the pressurized gas for the airbag cushion. The inflator may include an igniter or initiator assembly (not shown). The igniter receives a signal from a controller in order to initiate operation of the inflator when the controller determines a collision is occurring.

The airbag module 20 is mounted to the vehicle by the base plate 30. The base plate 30 holds the uninflated airbag cushion.

Cover 50 is attached to the module 20 such that an open area is created between the cover 50 and the base plate 30. The cover 50 forms the barrier between the airbag cushion and the inside of the vehicle passenger cabin area. For example, the cover 50 may form the panel along the front dashboard in a vehicle. The exterior wall 51 of the cover 50 is proximate the passenger cabin area and the interior wall 53 is proximate the airbag cushion and module 20.

It should be recognized by one skilled in the art that the cover 50 is not limited to a circular shape. The cover 50 may comprise any shape, with any suitable number of sides, such as a circle, oval, triangle, etc. The cover 50 is generally formed of a plastic material, such as a soft resin, or any other suitable material. The cover 50 must be able to withstand any wear and tear derived from its position in the cabin of a vehicle and must also be able to break open upon deployment of the airbag cushion.

The cover 50 includes locking pieces 60, as shown in FIGS. 1 and 2. Each locking piece 60 is configured to connect to an opening 70 in the base plate 30 and/or the housing 40. The locking piece 60, as shown in FIG. 2, includes a base portion 61 that extends outward from the surface of the cover 50, and a top portion 62. The top portion 62 includes a flange portion 63 that overhangs at least a part of the base portion 51. The top portion 62 can comprise a triangular shape, as shown in FIG. 2, or any other suitable shape.

In this embodiment, the locking pieces 60 are positioned circumferentially around the interior wall 53 of the cover 50. The locking pieces 60 can be arranged circumferentially around the housing 40 when the cover 50 is attached to the module 20. In this embodiment, the locking pieces 60 fit into a corresponding opening 70 in the housing 40.

The openings 70 include an entrance area 71 and a locking area 72. The locking area 72 is narrower than the entrance area 71. The top portion 62 of the locking piece 60 is inserted into the entrance area 71 of the opening. After the flange portion 63 passes through the opening, the cover is twisted such that the locking piece 60 enters the locking area 72, to lock the cover 50 to the module 20. The flange portion 63 of the locking piece 60 is larger than the locking area 72, which prevents the locking piece 60 from being pulled out of the opening and, thus unlocking the cover 50 from the module 20.

The opening 70 can include a guide lock 73. The guide lock 73 is a protrusion or step between the entrance area 71 and the locking area 72. The guide lock 73 prevents the locking piece 60 from sliding back into the entrance area 71 and from being pulled out of the opening 70.

Figure 4:
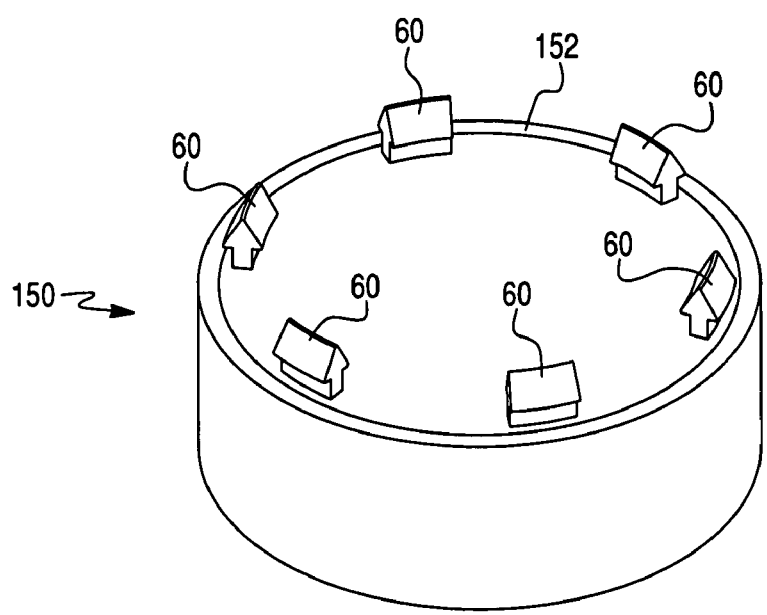
FIG. 4 is a side view of a cover according to another embodiment of the present invention.
Figure 5:
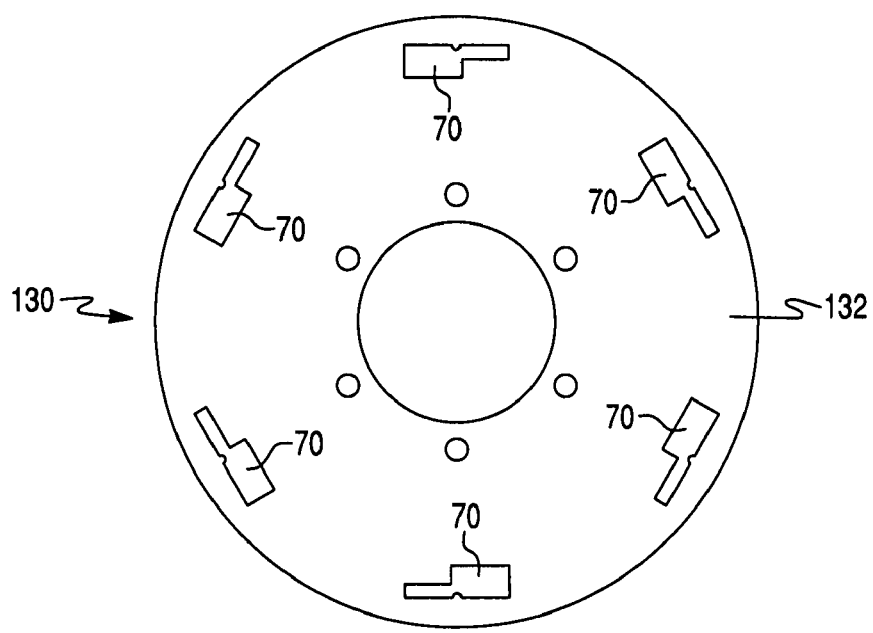
FIG. 5 is a top view of a base plate.

In another embodiment of the present invention, as shown in FIGS. 4 and 5, the locking pieces 60 can be positioned circumferentially around on the top edge 152 of the cover 150. The cover 150 can have six locking pieces 60, such as shown in FIG. 4, or any other suitable number of locking pieces 60. In this embodiment, the locking pieces 60 attach to openings 70 in the base plate 130.

In this embodiment, the locking pieces 60 are similar to the locking pieces 60 shown in FIG. 2 and described above. The openings 70 for receiving the locking pieces 60 are similar to the openings 70 shown in FIG. 3 and described above. The openings 70 are positioned around the periphery of the end wall 132 of the base plate 130.

Figure 6:
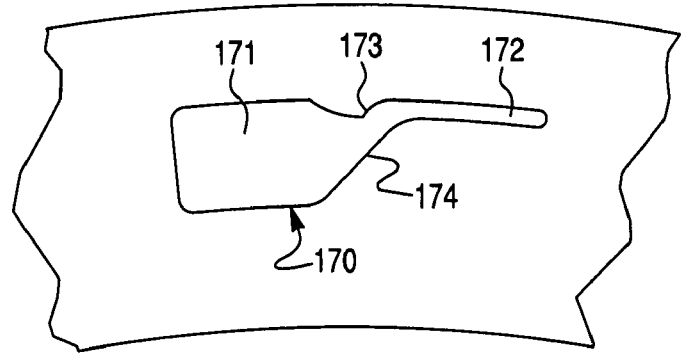
FIG. 6 is a top view of an opening.

In yet another embodiment, the opening 170 with entrance area 171 can include a slanted wall 174, as shown in FIG. 6. The slanted wall 174 helps guide the locking piece 60 into its proper location; the locking area 172. This embodiment also includes a guide lock 173, which is a protrusion jutting into the opening 170 across from the slanted wall 174.

Figure 7:
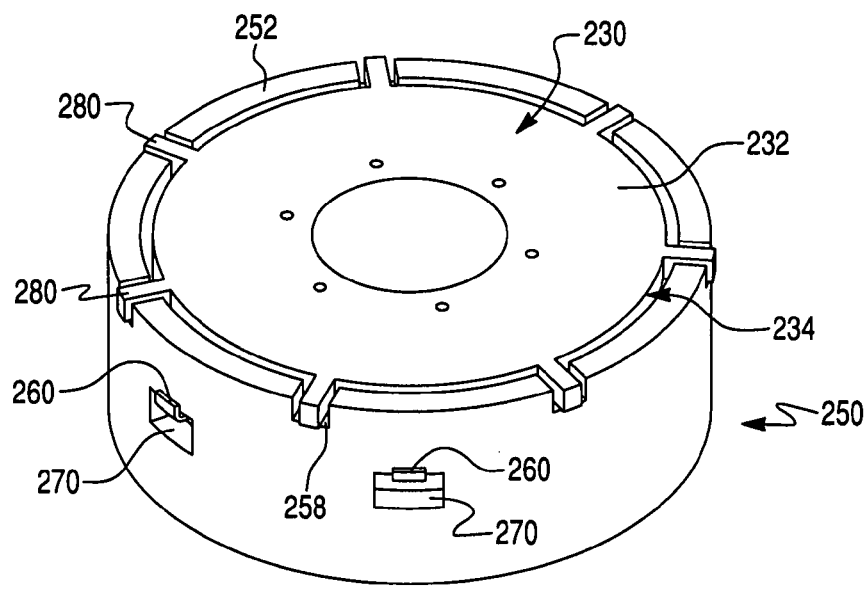
FIG. 7 is a perspective view of an airbag module according to another embodiment of the invention.
Figure 8:
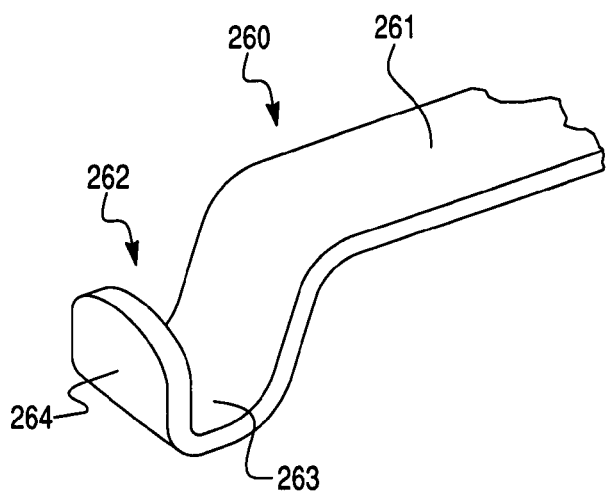
FIG. 8 is a perspective view of a locking piece of the airbag module of FIG. 7.

FIGS. 7 and 8 show another embodiment of the present invention in which the base plate 230 includes the locking pieces 260. The locking pieces 260 can extend from the end wall 232 of the base plate 230. In this embodiment, the cover 250 comprises the openings 270 for receiving the locking pieces 260.

In this embodiment, the locking piece 260 comprises a hook-like shape. The locking piece 260 includes an extending section 261 that is approximately perpendicular to the plane of the interior wall 253 of the cover 250. A hook section 262 is at the distal end of the extending section 261. The hook section 262 includes an indentation 263 that is configured to fit in the opening 270. A far side 264 of the hook section 262 is positioned on the end of the indentation 263 and is configured to be positioned on a side of the opening 270 opposite the extending section 261. The locking piece 260 fits into and locks into the opening 270. The extending section 261 extends perpendicular from the interior wall of the cover 250. The opening 270 is configured to be dimensioned so as to be able to receive the locking piece 260. The locking piece 260 fits into the opening 270 without requiring any sliding or radial movement of the cover 250 or the base plate 230.

The base plate 230 also includes locking tabs 280. The locking tabs 280 are configured to further secure the base plate 230 to the cover 250. The locking tabs 280 extend out from a side edge 234 of the base plate 230. The tabs 280 are configured to fit into corresponding notches 258 in the top edge 252 of the cover 250. The tabs 280, when fit in the corresponding notches 258, prevent the base plate 230 and cover 250 from twisting or moving relative to each other.

In other embodiments, a combination of locking pieces 60 and openings 70 can be used. The locking pieces 60 can be located on both the base plate 30 and the housing 40, or a mix of the cover 50, base plate 30, and housing 40. The housing 40 can also include the locking pieces 60 and the cover 50 can comprise the openings 70 for receiving the locking pieces 60. The locking pieces 60 can also attach to the base plate 30, housing 40 or cover 50. Accordingly, it will be recognized, that any combination of locking pieces 60, 260 can be used with a combination of openings 70, 170, 270. Further, any suitable amount of locking pieces 60, 260 and locking tabs 280 can be used.

According to another embodiment, the cover 50 can be assembled to the airbag module 20 without the use of specialized tools or extra components. The locking feature on the cover 50 and airbag module 20 can allow for a twist lock feature that doesn't require tools or spare parts.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module, comprising:
a base plate;
an airbag;
a housing for the airbag; and
a cover removably attached to the module,
wherein the base plate includes a locking tab extending from a circumferential edge of the base plate and configured to fit into a corresponding notch in the cover,
wherein the base plate includes an outward extending locking piece configured to attach to the cover, and
wherein the cover includes an opening to receive the locking piece, and the opening includes a guide lock to prevent the locking piece from sliding out of the opening.

2. The airbag module of claim 1, wherein the notch is positioned in a top edge of the cover.

3. The airbag module of claim 1, wherein the locking piece extends from an end wall of the base plate.

4. The airbag module of claim 1, wherein the locking piece comprises a base and a top portion, the top portion includes a flange that overhangs a portion of the base.

5. The airbag module of claim 1, wherein the locking piece comprises an extending section approximately perpendicular to a wall of the housing, and a hook section at a distal end of the extending section.

6. An airbag module, comprising:
a base plate;
an airbag;
a housing for the airbag; and
a cover removably attached to the module, the cover including a top wall and a side wall,
wherein the cover includes a locking piece extending from inner surface of a side wall of the cover, and the locking piece being configured to attach to the housing, and
wherein the housing includes an opening for receiving the locking piece, the opening including a guide lock to prevent the locking piece from sliding out of the opening.

7. The airbag module of claim 6, wherein the opening comprises an entrance opening portion and a locking portion,
wherein the locking portion is narrower than the opening portion.

8. The airbag module of claim 6, wherein the base plate includes an opening for receiving the locking piece.

9. The airbag module of claim 8, wherein the base plate opening comprises an entrance opening portion and a locking portion,
wherein the locking portion is narrower than the opening portion.

10. The airbag module of claim 6, wherein the locking piece comprises a base and a top portion, the top portion includes a flange that overhangs a portion of the base.

11. The airbag module of claim 6, wherein the locking piece comprises an extending section approximately perpendicular to an interior wall of the cover, and a hook section at a distal end of the extending section.

12. An airbag module, comprising:
a base plate;
an airbag;
a housing for the airbag; and
a cover removably attached to the module, the cover including a top wall and a side wall,
wherein the base plate includes an outward extending locking piece configured to attach to an opening in the side wall of the cover, and
wherein the opening includes a guide lock to prevent the locking piece from sliding out of the opening.

13. The airbag module of claim 12, wherein the opening comprises an entrance opening portion and a locking portion,
wherein the locking portion is narrower than the opening portion.

14. The airbag module of claim 12, wherein the locking piece comprises a base and a top portion, the top portion includes a flange that overhangs a portion of the base.

15. The airbag module of claim 12, wherein the locking piece comprises an extending section approximately perpendicular to a wall of the base plate, and a hook section at a distal end of the extending section.

16. The airbag module of claim 12, wherein the base plate includes a locking tab extending from a circumferential edge of the base plate and configured to fit into a corresponding notch in the cover.

* * * * *